United States Patent
Sudo et al.

(10) Patent No.: US 9,353,312 B2
(45) Date of Patent: *May 31, 2016

(54) POLYMERIZABLE COMPOUND-CONTAINING LIQUID CRYSTAL COMPOSITION AND LIQUID CRYSTAL DISPLAY DEVICE USING THE SAME

(71) Applicant: DIC CORPORATION, Tokyo (JP)

(72) Inventors: Go Sudo, Kitaadachi-gun (JP); Shotaro Kawakami, Kitaadachi-gun (JP)

(73) Assignee: DIC CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/727,323

(22) Filed: Jun. 1, 2015

(65) Prior Publication Data

US 2015/0259601 A1 Sep. 17, 2015

Related U.S. Application Data

(63) Continuation of application No. 13/995,879, filed as application No. PCT/JP2011/078999 on Dec. 15, 2011, now Pat. No. 9,080,101.

(30) Foreign Application Priority Data

Dec. 24, 2010 (JP) ................................. 2010-287712

(51) Int. Cl.
C09K 19/30 (2006.01)
C09K 19/12 (2006.01)
C09K 19/56 (2006.01)
G02F 1/1337 (2006.01)
C09K 19/54 (2006.01)
C09K 19/04 (2006.01)

(52) U.S. Cl.
CPC ............ C09K 19/3066 (2013.01); C09K 19/12 (2013.01); C09K 19/542 (2013.01); C09K 19/56 (2013.01); G02F 1/133788 (2013.01); C09K 2019/0448 (2013.01); C09K 2019/122 (2013.01); C09K 2019/3016 (2013.01); C09K 2019/548 (2013.01)

(58) Field of Classification Search
CPC .... C09K 19/3066; C09K 19/12; C09K 19/56; C09K 19/542; C09K 2019/0448; C09K 2019/122; C09K 2019/3016; C09K 2019/548; G02F 1/133788
USPC ............... 428/1.1; 349/182, 183; 252/299.01, 252/299.6, 299.61, 299.63, 299.66
See application file for complete search history.

(56) References Cited

U.S. PATENT DOCUMENTS

| 7,807,068 | B2 | 10/2010 | Bremer et al. |
| 8,535,768 | B2 * | 9/2013 | Saito .............................. 428/1.1 |
| 2008/0308768 | A1 | 12/2008 | Klasen-Memmer et al. |
| 2009/0141215 | A1 | 6/2009 | Bremer et al. |
| 2010/0051864 | A1 | 3/2010 | Klasen-Memmer et al. |
| 2010/0309423 | A1 | 12/2010 | Bernatz et al. |
| 2011/0101269 | A1 | 5/2011 | Bernatz et al. |
| 2011/0147658 | A1 | 6/2011 | Saito et al. |
| 2011/0155953 | A1 | 6/2011 | Hattori et al. |
| 2011/0198537 | A1 | 8/2011 | Furusato et al. |
| 2011/0272630 | A1 | 11/2011 | Shimada et al. |
| 2013/0334462 | A1 * | 12/2013 | Sudo et al. ............... 252/299.63 |

FOREIGN PATENT DOCUMENTS

| JP | 7-101904 A | 4/1995 |
| JP | 2003-307720 A | 10/2003 |
| JP | 2004-302096 A | 10/2004 |
| JP | 2005-106986 A | 4/2005 |
| JP | 2006-37053 A | 2/2006 |
| JP | 2008-505235 A | 2/2008 |
| JP | 2008-116931 A | 5/2008 |
| JP | 2009-53544 A | 3/2009 |
| JP | 2009-057562 A | 3/2009 |
| JP | 2009-69493 A | 4/2009 |
| JP | 2009-132718 A | 6/2009 |
| JP | 2010-059221 A | 3/2010 |
| JP | 2010-215609 A | 9/2010 |
| JP | 2010-536894 A | 12/2010 |
| JP | 2010-537256 A | 12/2010 |

(Continued)

OTHER PUBLICATIONS

International Search Report for PCT/JP2011/078999, Mailing Date of Mar. 13, 2012. (3 pages).

(Continued)

*Primary Examiner* — Geraldina Visconti

(74) *Attorney, Agent, or Firm* — Westerman, Hattori, Daniels & Adrian, LLP

(57) ABSTRACT

A polymerizable compound-containing liquid crystal composition of the present invention relates to a liquid crystal composition containing a polymerizable compound represented by general formula (I) and a compound represented by general formula (II) and can be used for a liquid crystal display device imparted with liquid crystal aligning ability by polymerization. The polymerizable liquid crystal composition is required to cause no precipitation in a wide temperature range and have a low viscosity corresponding to fast switching, and a liquid crystal display device using the composition is required to have more stable alignment after polymerization and to cause no defect in display characteristics. In the present invention, the problems can be solved using a specified compound.

16 Claims, No Drawings

(56) References Cited

FOREIGN PATENT DOCUMENTS

| | | |
|---|---|---|
| WO | 2006/002952 A1 | 1/2006 |
| WO | 2009/030329 A1 | 3/2009 |
| WO | 2010/024164 A1 | 3/2010 |
| WO | 2010/032587 A1 | 3/2010 |
| WO | 2010/047206 A1 | 4/2010 |
| WO | 2010/084823 A1 | 7/2010 |
| WO | 2010/095493 A1 | 8/2010 |

OTHER PUBLICATIONS

Inukai et al., "Development Overview of Display for the nematic liquid crystal compound", Ekisho, vol. 1, No. 1, (1997) pp. 9-22.

Numata H., "Technical Trend in Liquid Crystal Material", pp. 1-7.

"Measuring methods for Liquid Crystal Display panels and constructive materials", Standard of Japan Electronics and Information Technology Industries Association, JEITA ED-2521B, Japan Electronics and Information Technology Industries Association, Feb. 1990 (6 pages).

"Viscosity of liquid-Methods of measurement", Japanese Industrial Standards, Z 8803 (1 page).

"Chemistry Experiment Guide Book for Middle/High School Students and Instructors", the Chemical Society of Japan, 1994 (8 pages).

"New Experimental Chemistry Course Basic Operation2", the Chemical Society of Japan (6 pages).

* cited by examiner

POLYMERIZABLE COMPOUND-CONTAINING LIQUID CRYSTAL COMPOSITION AND LIQUID CRYSTAL DISPLAY DEVICE USING THE SAME

CROSS-REFERENCE TO RELATED APPLICATIONS

This application is a continuation of U.S. application Ser. No. 13/995,879, filed on Sep. 4, 2013, and wherein U.S. application Ser. No. 13/995,879 is a national stage application filed under 35 U.S.C. §371 of International Application No. PCT/JP2011/078999, filed Dec. 15, 2011, which is based upon and claims the benefit of priority of the prior Japanese Patent Application No. 2010-287712, filed on Dec. 24, 2010, the entire contents of which are incorporated herein by reference.

TECHNICAL FIELD

The present invention relates to a polymerizable compound-containing liquid crystal composition and a liquid crystal display device using the same.

BACKGROUND ART

PSA (Polymer Sustained Alignment)-type liquid crystal display devices have a structure in which a polymer structure is formed in a cell in order to control the pretilt angle of liquid crystal molecules, and have been progressively developed as liquid crystal display devices in view of their rapid response and high contrast.

A PSA-type liquid crystal display device is manufactured by injecting a polymerizable compound-containing liquid crystal composition containing a polymerizable compound and a liquid crystal compound between substrates, and polymerizing the polymerizable compound under a condition where liquid crystal molecules are aligned by applying a voltage, thereby fixing the alignment of the liquid crystal molecules. In the PSA-type liquid crystal display device, impurities and a change in alignment of the liquid crystal molecules (change in pretilt angle) are known as causes for image sticking as a display defect.

A cause for a change in pretilt angle is that in a configuration of a liquid crystal display device using a soft polymer which is a cured product of a polymerizable compound, a polymer structure is changed when the same pattern is continuously displayed for a long time, resulting in a change in pretilt angle. Therefore, a polymerizable compound which forms a polymer having a rigid structure with no change in the polymer structure is required.

In order to prevent image sticking by improving the rigidity of a polymer, it has been investigated to constitute a display device using a polymerizable compound having a structure of 1,4-phenylene group or the like, which contains only a ring structure and a polymerizable functional group (refer to Patent Literature 1), or constitute a display device using a polymerizable compound having a biaryl structure (refer to Patent Literature 2). However, such polymerizable compounds have low compatibility with liquid crystal compounds and thus, when a liquid crystal composition containing a polymerizable compound is prepared, the problems such as precipitation of the polymerizable compound are produced, leading to the need for improvement in compatibility with the liquid crystal composition.

Also, in order to prevent image sticking by improving the rigidity of a polymer, it has been proposed to constitute a display device using a mixed liquid crystal composition containing a bifunctional polymerizable compound and a tri- or higher-functional polymerizable compound, such as dipentaerythritol pentaacrylate, dipentaerythritol hexaacrylate, or the like (refer to Patent Literature 3). However, dipentaerythritol pentaacrylate and dipentaerythritol hexaacrylate have no ring structure in the molecules thereof and thus have weak affinity for liquid crystal compounds and weak force to regulate alignment, thereby causing the problem of failing to achieve satisfactory alignment stability. In addition, polymerization of these polymerizable compounds requires a polymerization initiator to be added, and if a polymerization initiator is not added, the polymerizable compounds remain after polymerization.

In addition, various combinations of liquid crystal compositions and polymerizable compounds (refer to Patent Literature 4) are disclosed as methods for improving switching speeds. However, a relation between the pretilt angle and switching speed is generally known, and a significant improvement effect has not been confirmed. Since liquid crystal compounds containing an alkenyl group and chlorine atom are used, a defective display is highly likely to be caused, resulting in impracticality.

Therefore, there has been demand for a polymerizable compound-containing liquid crystal composition which simultaneously resolves the problems of preventing the occurrence of precipitation in a wide temperature range and the occurrence of image sticking, and achieving a fast switching, etc., and a liquid crystal display device using the liquid crystal composition.

CITATION LIST

Patent Literature

PTL 1: Japanese Unexamined Patent Application Publication No. 2003-307720
PTL 2: Japanese Unexamined Patent Application Publication No. 2008-116931
PTL 3: Japanese Unexamined Patent Application Publication No. 2004-302096
PTL 4: WO2010/084823

SUMMARY OF INVENTION

Technical Problem

A problem to be solved by the present invention is to provide a polymerizable compound-containing liquid crystal composition which causes no precipitation within a wide temperature range and no failure in display characteristics, such as image sticking or the like, and which has low viscosity corresponding to fast switching, and to provide a liquid crystal display device having excellent display quality without display unevenness by using the polymerizable compound-containing liquid crystal composition.

Solution to Problem

As a result of research of various polymerizable compounds and liquid crystal compounds, the inventors of the present invention found that the above-described problem can be resolved with a polymerizable compound-containing liquid crystal composition containing a polymerizable compound and a liquid crystal compound each having a specified structure, leading to the achievement of the present invention.

The present invention provides a polymerizable compound-containing liquid crystal composition including, as a first component, at least one polymerizable compound represented by general formula (I),

[Chem. 1]

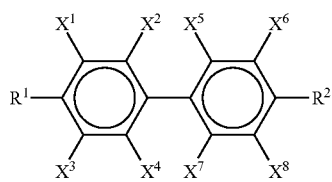

(I)

(in the formula, $R^1$ and $R^2$ each independently represent any one of formulae (R-1) to (R-15) below,

[Chem. 2]

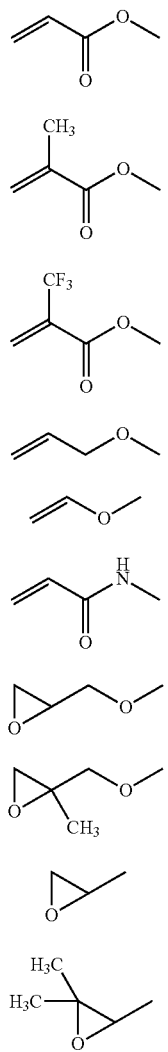

(R-1)
(R-2)
(R-3)
(R-4)
(R-5)
(R-6)
(R-7)
(R-8)
(R-9)
(R-10)

-continued

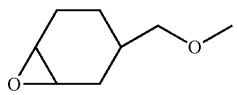
(R-11)

(R-12)

(R-13)

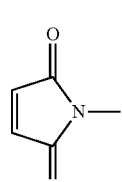
(R-14)

(R-15)
HS— and $X^1$ to $X^8$ each independently represent a trifluoromethyl group, a trifluoromethoxy group, a fluorine atom, or a hydrogen atom, but at least one of $X^1$ to $X^8$ represents a fluorine atom); and as a second component, at least one compound represented by general formula (II),

[Chem. 3]

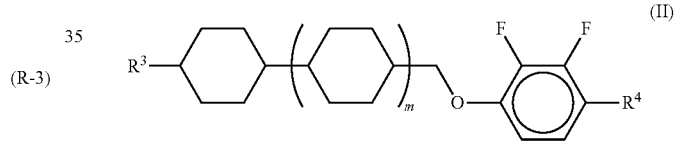

(II)

(in the formula, $R^3$ represents an alkyl group having 1 to 10 carbon atoms or an alkenyl group having 2 to 10 carbon atoms, in which at least one hydrogen atom present in the group may be substituted by a fluorine atom, $R^4$ represents an alkyl group or alkoxyl group having 1 to 10 carbon atoms or an alkenyl group or alkenyloxy group having 2 to 10 carbon atoms, in which at least one hydrogen atom present in the group may be substituted by a fluorine atom, and m represents 0, 1, or 2). Also the present invention provides a liquid crystal display device using the liquid crystal composition.

Advantageous Effects of Invention

Since the liquid crystal compound and the polymerizable compound in the polymerizable compound-containing liquid crystal composition of the present invention have excellent compatibility with each other, a nematic state can be maintained without sedimentation of the said liquid crystal or polymerizable compounds even in long-term storage at a low temperature, thereby securing a very wide range of driving temperatures in practical application. In addition, the liquid crystal composition of the present invention has a low viscosity and thus exhibits a fast switching when used in a liquid crystal display device and can be applied to 3D display. Further, the polymerizable compound of the present invention has an appropriate polymerization rate during photopolymerization, not an excessively high or low polymerization rate, and thus it is possible to achieve uniform and stable alignment control and provide a liquid crystal display device with little or no image sticking, display unevenness, or the like. Therefore, the liquid crystal composition of the present invention is very useful.

DESCRIPTION OF EMBODIMENTS

A polymerizable compound-containing liquid crystal composition of the present invention includes at least one polymerizable compound represented by general formula (I) as a first component,

[Chem. 4]

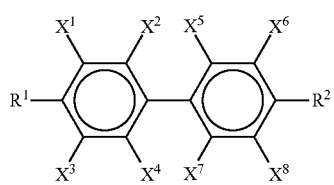
(I)

and at least one compound represented by general formula (II),

[Chem. 5]

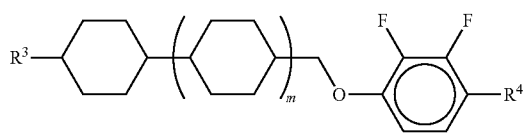
(II)

as a second component.

In the general formula (I), $R^1$ and $R^2$ each independently represent any one of formulae (R-1) to (R-15) below,

[Chem. 6]

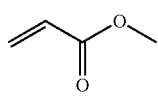
(R-1)

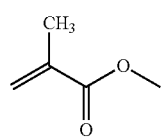
(R-2)

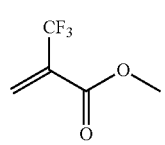
(R-3)

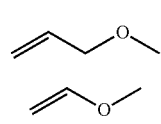
(R-4)

(R-5)

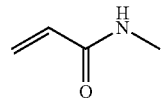
(R-6)

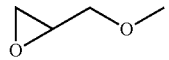
(R-7)

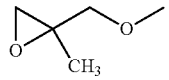
(R-8)

(R-9)

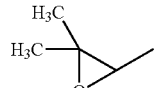
(R-10)

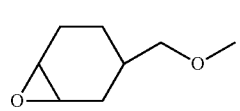
(R-11)

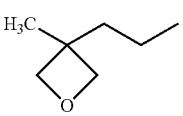
(R-12)

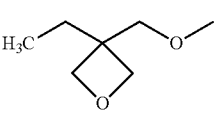
(R-13)

(R14)

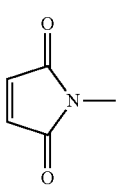

(R-15)

and $X^1$ to $X^8$ each independently represent a trifluoromethyl group, a trifluoromethoxy group, a fluorine atom, or a hydrogen atom, but at least one of $X^1$ to $X^8$ represents a fluorine atom.

These polymerizable groups are cured by radical polymerization, radical addition polymerization, cation polymerization, or anion polymerization. In a polymerization method by ultraviolet irradiation, formula (R-1), formula (R-2), formula (R-4), formula (R-5), formula (R-7), formula (R-11), formula (R-13), or formula (R-15) is preferred, formula (R-1) or formula (R-2) is more preferred, and formula (R-2) is particularly preferred.

In the general formula (I), $X^1$ to $X^8$ each independently represent a trifluoromethyl group, a trifluoromethoxy group, a fluorine atom, or a hydrogen atom, but a fluorine atom is particularly preferred.

More preferred examples of a structure of a biphenyl skeleton in the general formula (I) include those of formulae (I-11) to (I-14), and the formula (I-11) is particularly preferred.

[Chem. 7]

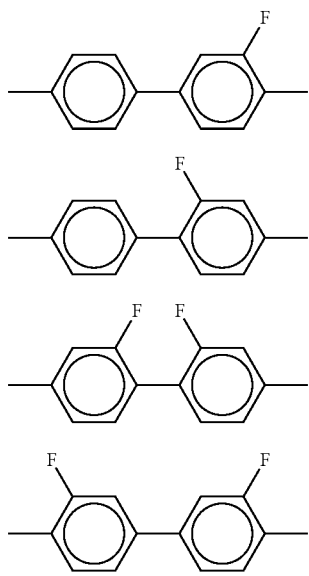

(I-11)

(I-12)

(I-13)

(I-14)

Polymerizable compounds having skeletons represented by the formula (I-11) to the formula (I-14) have, after polymerization, optimum alignment regulating force for PSA-type liquid crystal display devices and produce a good alignment state, thereby suppressing or preventing the occurrence of display unevenness.

The polymerizable compound-containing liquid crystal composition of the present invention contains at least one polymerizable compound represented by the general formula (I), but preferably contains 1 to 5 compounds and more preferably 1 to 3 compounds. With a low content of the polymerizable compound represented by the general formula (I), the alignment regulating force for the liquid crystal composition is weakened. In contrast, with an excessively high content of the polymerizable compound represented by the general formula (I), the energy required for polymerization is increased to increase the amount of the polymerizable compound remaining unpolymerized, thereby causing a display defect. Therefore, the content is preferably 0.01 to 2.00% by mass, more preferably 0.05 to 1.00% by mass, and particularly preferably 0.10 to 0.50% by mass.

In the general formula (II), $R^3$ represents an alkyl group having 1 to 10 carbon atoms or an alkenyl group having 2 to 10 carbon atoms, wherein at least one hydrogen atom present in the group may be substituted by a fluorine atom, $R^4$ represents an alkyl group or alkoxyl group having 1 to 10 carbon atoms or an alkenyl group or alkenyloxy group having 2 to 10 carbon atoms, wherein at least one hydrogen atom present in the group may be substituted by a fluorine atom, and m represents 0, 1, or 2. However, $R^3$ more preferably represents a linear group and an alkyl group having 1 to 10 carbon atoms and particularly preferably an alkyl group having 1 to 5 carbon atoms, $R^4$ more preferably represents a linear group and an alkyl group or alkoxyl group having 1 to 5 carbon atoms and particularly preferably an alkoxyl group having 1 to 5 carbon atoms, and m more preferably represents 0 or 1.

The polymerizable compound-containing liquid crystal composition of the present invention contains at least one compound represented by the general formula (II), but preferably contains 1 to 6 compounds and more preferably 2 to 5 compounds. The content of the compound represented by the general formula (II) is 5 to 35% by mass, more preferably 10 to 35% by mass, and particularly preferably 15 to 30% by mass.

In further detail, the general formula (II) is particularly preferably general formula (II-A) or general formula (II-B).

[Chem. 8]

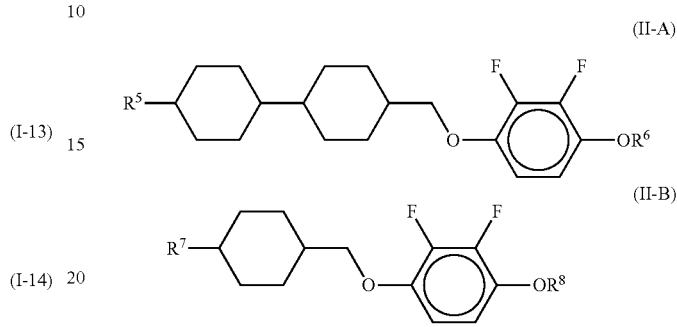

(II-A)

(II-B)

(In the formulae, $R^5$, $R^6$, $R^7$, and $R^8$ each independently represent the same meaning as $R^3$.)

The polymerizable compound-containing liquid crystal composition of the present invention more preferably further contains at least one compound represented by general formula (III).

[Chem. 9]

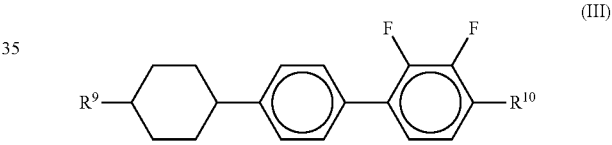

(III)

(In the formula, $R^9$ represents the same meaning as $R^3$, and $R^{10}$ represents the same meaning as $R^4$.)

The polymerizable compound-containing liquid crystal composition of the present invention contains at least one compound represented by the general formula (III), but preferably contains 1 to 6 compounds and more preferably 2 to 5 compounds. The content of the general formula (III) is preferably 5 to 35% by mass, more preferably in a range of 10 to 30% by mass, and most preferably in a range of 15 to 30% by mass.

In further detail, the general formula (III) is particularly preferably general formula (III-A).

[Chem. 10]

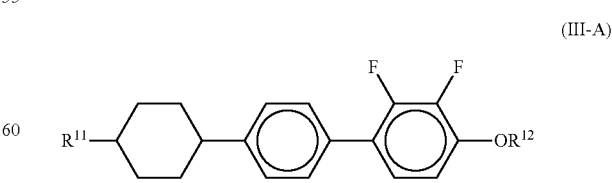

(III-A)

(In the formulae, $R^{11}$ and $R^{12}$ each independently represent the same meaning as $R^3$.)

The liquid crystal compounds contained in the polymerizable compound-containing liquid crystal composition of the present invention have no partial structure such as —O—O—, —O—S—, or —S—S—, in which heteroatoms are directly bonded together. Also, the compounds preferably include no compound having an alkenyl group, and side chains of all liquid crystal compounds are more preferably alkyl groups or alkoxy groups. In order to suppress or prevent the occurrence of display defects such as image sticking, nonuniformity in display, etc., each of the liquid crystal compounds preferably contains a cyclohexane ring, a benzene ring, or a fluorine-substituted benzene ring in its structure, but substitution with chlorine is undesired even if it is a halogen atom. The use of a chlorine-substituted liquid crystal compound is unpractical because it causes defective display.

A liquid crystal display device formed using the liquid crystal composition containing the compounds of the general formulae (I), (II), and (III) improves a fast switching characteristic due to low viscosity of the composition.

In the present invention, a nematic-isotropic liquid phase transition temperature ($T_{ni}$) is preferably 60° C. to 120° C., more preferably 70° C. to 100° C. and particularly preferably 70° C. to 85° C. In addition, $\Delta\in$ at 25° C. is preferably −2.0 to −6.0, more preferably −2.5 to −5.0, particularly preferably −2.5 to −3.5. An at 25° C. is preferably 0.08 to 0.13 and more preferably 0.09 to 0.12. In further detail, in response to a thin cell gap, Δn at 25° C. is preferably 0.10 to 0.12, while in response to a thick cell gap, Δn at 25° C. is preferably 0.08 to 0.10. The viscosity at 20° C. is preferably 10 to 30 mPa·s, more preferably 10 to 25 mPa·s, and particularly preferably 10 to 20 mPa·s.

The polymerizable compound-containing liquid crystal composition of the present invention may further contain, besides the above-described compounds, a usual nematic liquid crystal, smectic liquid crystal, cholesteric liquid crystal, antioxidant, ultraviolet absorber, polymerizable monomer, or the like. For example, compounds represented by general formulae (IV-1) to (IV-12) may be contained.

[Chem. 11]

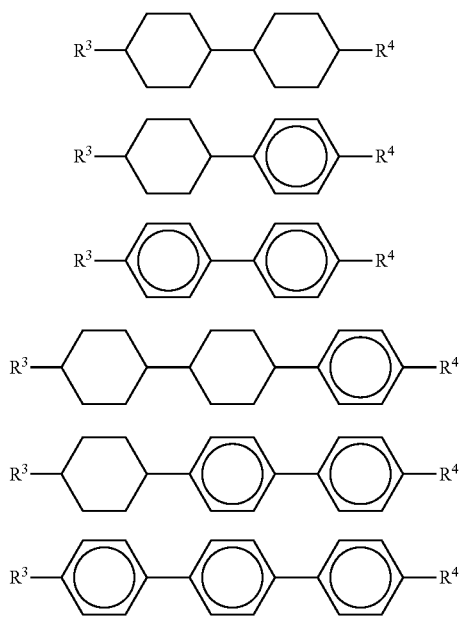

[Chem. 12]

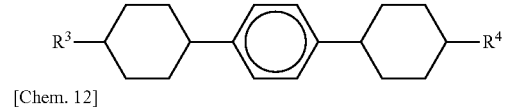

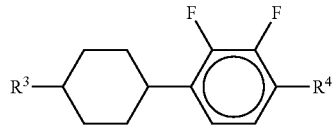

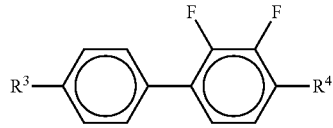

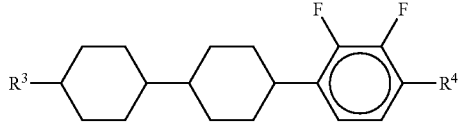

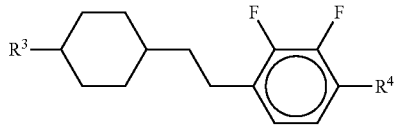

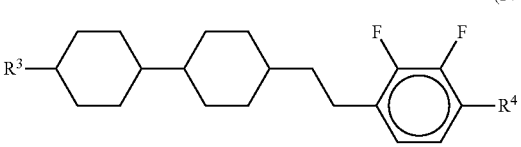

Although polymerization proceeds in the polymerizable compound-containing liquid crystal composition of the present invention even in the absence of a polymerization initiator, the composition may contain the polymerization initiator for promoting polymerization. Examples of the polymerization initiator include benzoin ethers, benzophenones, acetophenones, benzylketals, acylphosphine oxides, and the like. In order to improve storage stability, a stabilizer may be added to the liquid crystal composition of the present invention. Examples of the stabilizer which can be used include hydroquinones, hydroquinone monoalkyl ethers, tert-butyl-catechols, pyrogallols, thiophenols, nitro compounds, β-naphthylamines, β-naphthols, nitroso compounds, and the like. The polymerizable compound-containing liquid crystal composition of the present invention is useful for a liquid crystal display device, particularly a liquid crystal display device for active matrix driving, and can be used for a liquid crystal display device for a PSA mode, PSVA mode, VA-mode, IPS mode, or ECB mode.

The polymerizable compound-containing liquid crystal composition of the present invention is imparted with a liquid crystal aligning ability through ultraviolet irradiation polymerization of the polymerizable compound contained in the liquid crystal composition, and is used for a liquid crystal display device in which the amount of transmitted light is controlled by using birefringence of the liquid crystal composition. The liquid crystal composition is useful for liquid crystal display devices such as AM-LCD (active matrix liquid crystal display device), TN (twisted nematic liquid crystal display device), STN-LCD (super twisted nematic liquid crystal display device), OCB-LCD and IPS-LCD (in-plane switching liquid crystal display device), and particularly useful for AM-LCD. The liquid crystal composition can be used for a transmissive or reflective liquid crystal display device.

Two substrates of a liquid crystal cell used in the liquid crystal display device can be made of a transparent material with flexibility, such as glass or plastic, and one of the substrates may be made of an opaque material such as silicon or the like. A transparent substrate including a transparent electrode layer can be formed by, for example, sputtering indium-tin oxide (ITO) on a transparent substrate such as a glass plate.

A color filter can be formed by, for example, a pigment dispersion method, a printing method, an electrodeposition method, or a dyeing method. The pigment dispersion method is described as an example of the method for forming the color filter. A curable colored composition for a color filter is applied to the transparent substrate, patterned, and then cured by heating or light irradiation. This process is performed for each of the three colors of red, green, and blue, forming pixel portions for the color filter. Further, a pixel electrode provided with an active element such as TFT, a thin-film diode, a metal insulator, a metal resistivity element, or the like may be provided on the substrate.

The substrates are opposed to each other so that the transparent electrode layers face inward. In this case, the distance between the substrates may be adjusted using a spacer so that the thickness of the resultant light control layer is preferably 1 to 100 μm and more preferably 1.5 to 10 μm. When a polarizing plate is used, the product of refractive index anisotropy Δn of the liquid crystal and cell thickness d is preferably adjusted to maximize the contrast. In addition, when two polarizing plates are provided, the polarizing axis of each of the polarizing plates can be adjusted to improve the viewing angle and contrast. Further, a retardation film can be used for widening the viewing angle. Examples of the spacer include glass particles, plastic particles, alumina particles, photoresist materials, and the like. Then, a sealing agent such as an epoxy-based thermosetting composition is screen-printed on each of the substrates provided with a liquid crystal injection port, the substrates are bonded together, and the sealing agent is thermally cured by heating.

As a method for holding the polymerizable compound-containing liquid crystal composition between the two substrates, a usual vacuum injection method or an ODF method can be used.

A preferred method as a method for polymerizing the polymerizable compound is to polymerize the compound by irradiation with one type or combination of two or more types of active energy rays such as ultraviolet rays, electron beams, and the like, or by successive irradiation with these types of active energy rays because a proper polymerization rate is desired for achieving good alignment performance for the liquid crystal. In the use of ultraviolet rays, a polarized light source or an unpolarized light source may be used. When the polymerizable compound-containing liquid crystal composition is polymerized in the state of being held between the two substrates, at least the irradiation-side substrate must be imparted with proper transparency for the active energy rays. Another method may be used, in which after a specified portion is polymerized by light irradiation using a mask, the alignment state of an unpolymerized portion is changed by changing the condition such as an electric field, a magnetic field, or temperature, followed by further polymerization through irradiation with active energy rays. In particular, ultraviolet exposure is preferably performed with an alternating current electric field applied to the polymerizable compound-liquid crystal composition. The applied alternating current electric field is preferably has a frequency of 10 Hz to 10 kHz and more preferably a frequency of 60 Hz to 10 kHz, and the voltage is selected depending to the desired pretilt angle of the liquid crystal display device. That is, the pretilt angle of the liquid crystal display device can be controlled by the applied voltage. In a MVA-mode liquid crystal display device, the pretilt angle is preferably controlled to 80 degrees to 89.9 degrees from the viewpoint of alignment stability and contrast.

The temperature of irradiation preferably falls in a temperature range where the liquid crystal state of the liquid crystal composition of the present invention is maintained. Polymerization is preferably performed at a temperature close to room temperature, i.e., typically a temperature of 15 to 35° C. As a lamp for emitting ultraviolet rays, a metal halide lamp, a high-pressure mercury lamp, an ultrahigh-pressure mercury lamp, or the like can be used. In addition, the wavelength of irradiating ultraviolet rays preferably falls in an ultraviolet wavelength region excluding an absorption wavelength region of the liquid crystal composition, and, if required, ultraviolet rays may be partially cut off. The intensity of the irradiating ultraviolet rays is preferably 0.1 mW/cm$^2$ to 100 W/cm$^2$ and more preferably 2 mW/cm$^2$ to 50 W/cm$^2$. The energy of the irradiating ultraviolet rays can be appropriately adjusted, but is preferably 10 mJ/cm$^2$ to 500 J/cm$^2$ and more preferably 100 mJ/cm$^2$ to 200 J/cm$^2$. The intensity may be changed during ultraviolet irradiation. The time of ultraviolet irradiation is appropriately selected depending on the intensity of the irradiating ultraviolet rays, but is preferably 10 seconds to 3600 seconds and more preferably 10 seconds to 600 seconds.

EXAMPLES

The present invention is described in further detail below with reference to examples, but the present invention is not limited to these examples. In a composition of each of the examples and comparative examples, "%" represents "% by mass".

In the examples, the measured characteristics are as follows.

$T_{ni}$: nematic-isotropic liquid phase transition temperature (° C.)

Δn: refractive index anisotropy at 25° C.

Δ∈: dielectric constant anisotropy at 25° C.

η: viscosity at 20° C. (mPa·s)

Example 1

A polymerizable compound-containing liquid crystal composition prepared and physical property values thereof are given below.

[Chem. 13]

(Liquid crystal composition)

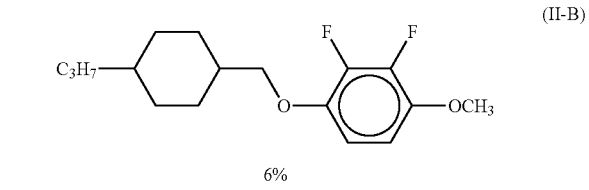

6%

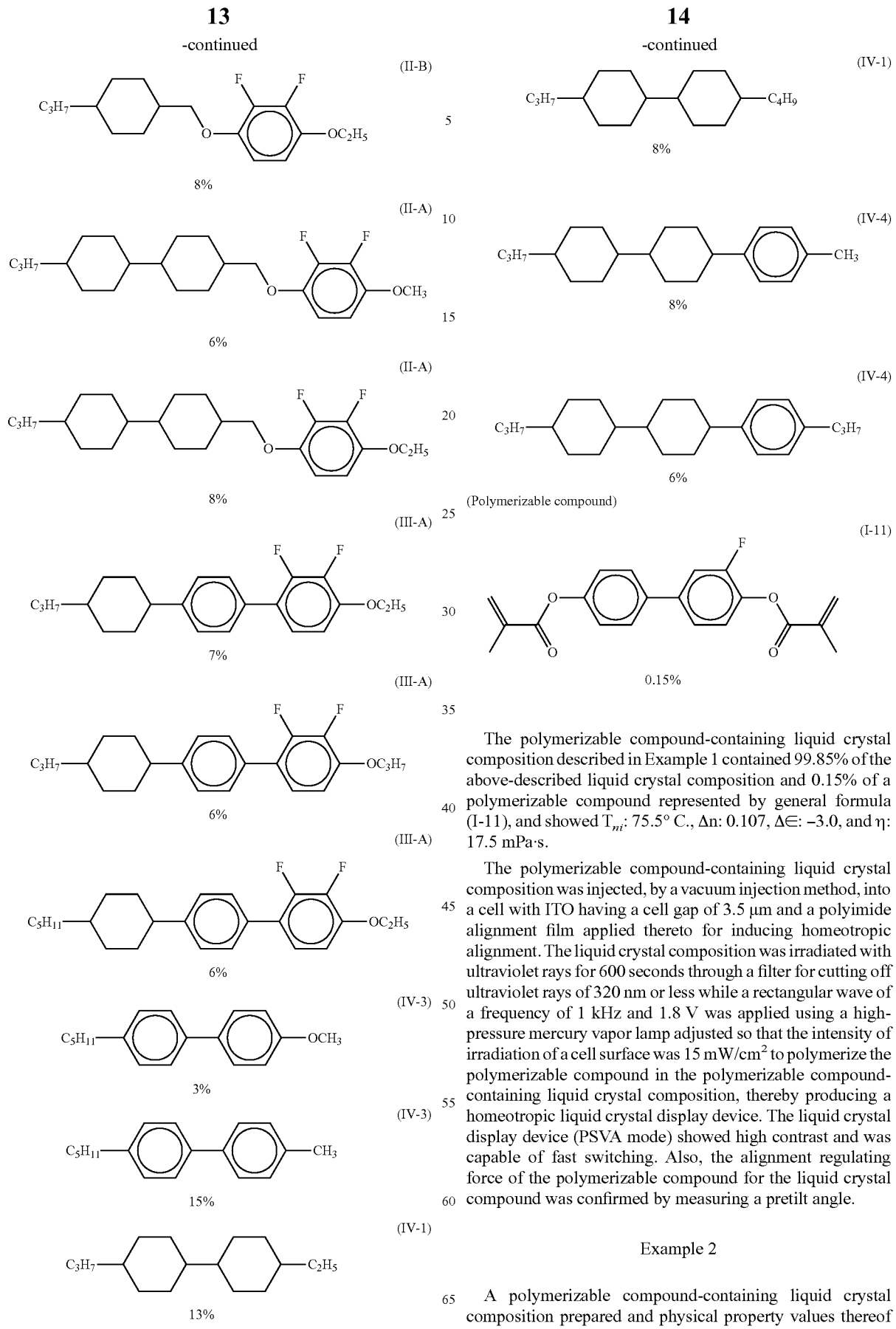

(Polymerizable compound)

The polymerizable compound-containing liquid crystal composition described in Example 1 contained 99.85% of the above-described liquid crystal composition and 0.15% of a polymerizable compound represented by general formula (I-11), and showed $T_{ni}$: 75.5° C., Δn: 0.107, Δ∈: −3.0, and η: 17.5 mPa·s.

The polymerizable compound-containing liquid crystal composition was injected, by a vacuum injection method, into a cell with ITO having a cell gap of 3.5 μm and a polyimide alignment film applied thereto for inducing homeotropic alignment. The liquid crystal composition was irradiated with ultraviolet rays for 600 seconds through a filter for cutting off ultraviolet rays of 320 nm or less while a rectangular wave of a frequency of 1 kHz and 1.8 V was applied using a high-pressure mercury vapor lamp adjusted so that the intensity of irradiation of a cell surface was 15 mW/cm² to polymerize the polymerizable compound in the polymerizable compound-containing liquid crystal composition, thereby producing a homeotropic liquid crystal display device. The liquid crystal display device (PSVA mode) showed high contrast and was capable of fast switching. Also, the alignment regulating force of the polymerizable compound for the liquid crystal compound was confirmed by measuring a pretilt angle.

Example 2

A polymerizable compound-containing liquid crystal composition prepared and physical property values thereof are given below.

[Chem. 14]

(Liquid crystal composition)

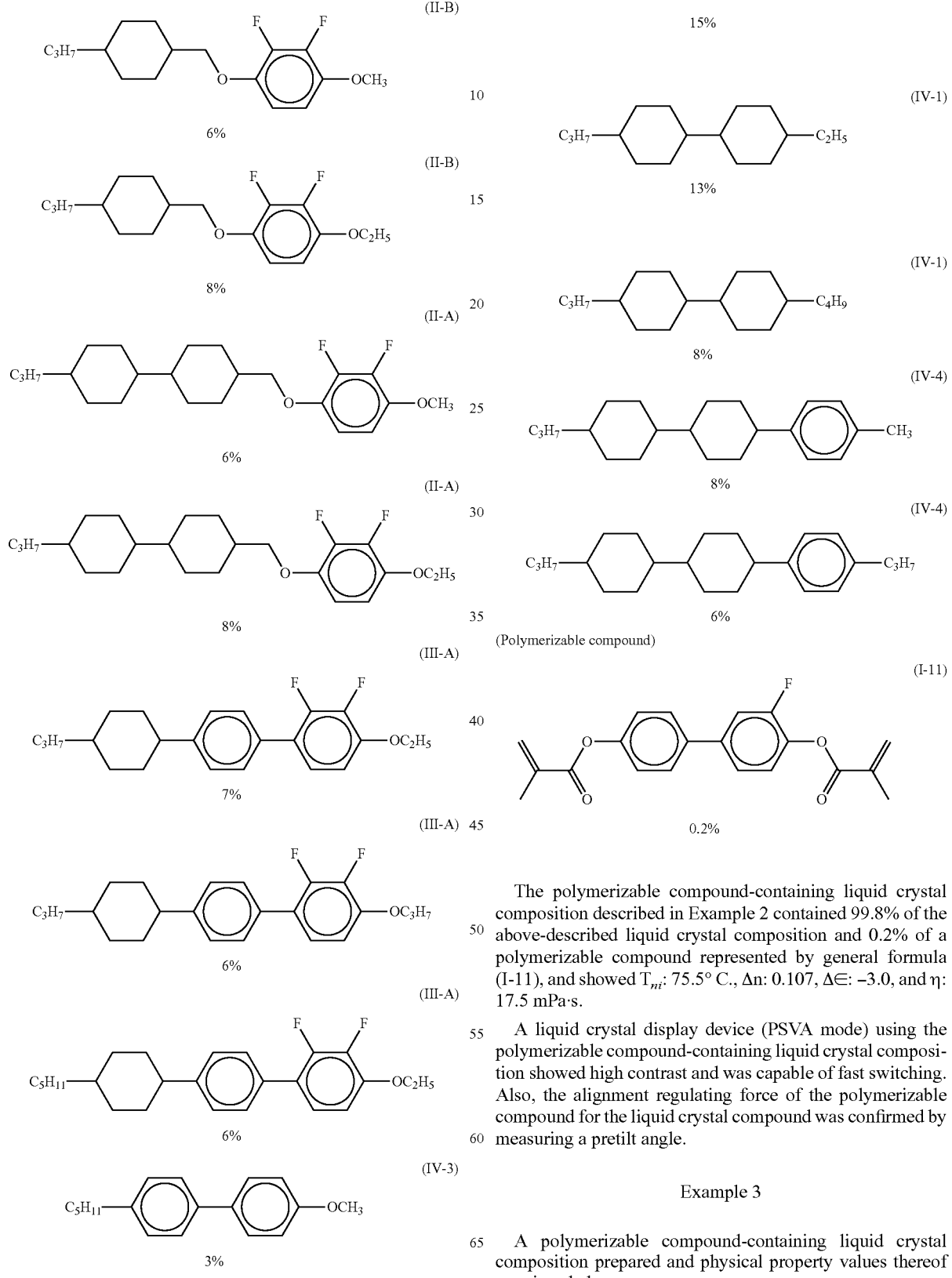

(Polymerizable compound)

The polymerizable compound-containing liquid crystal composition described in Example 2 contained 99.8% of the above-described liquid crystal composition and 0.2% of a polymerizable compound represented by general formula (I-11), and showed $T_{ni}$: 75.5° C., Δn: 0.107, Δ∈: −3.0, and η: 17.5 mPa·s.

A liquid crystal display device (PSVA mode) using the polymerizable compound-containing liquid crystal composition showed high contrast and was capable of fast switching. Also, the alignment regulating force of the polymerizable compound for the liquid crystal compound was confirmed by measuring a pretilt angle.

Example 3

A polymerizable compound-containing liquid crystal composition prepared and physical property values thereof are given below.

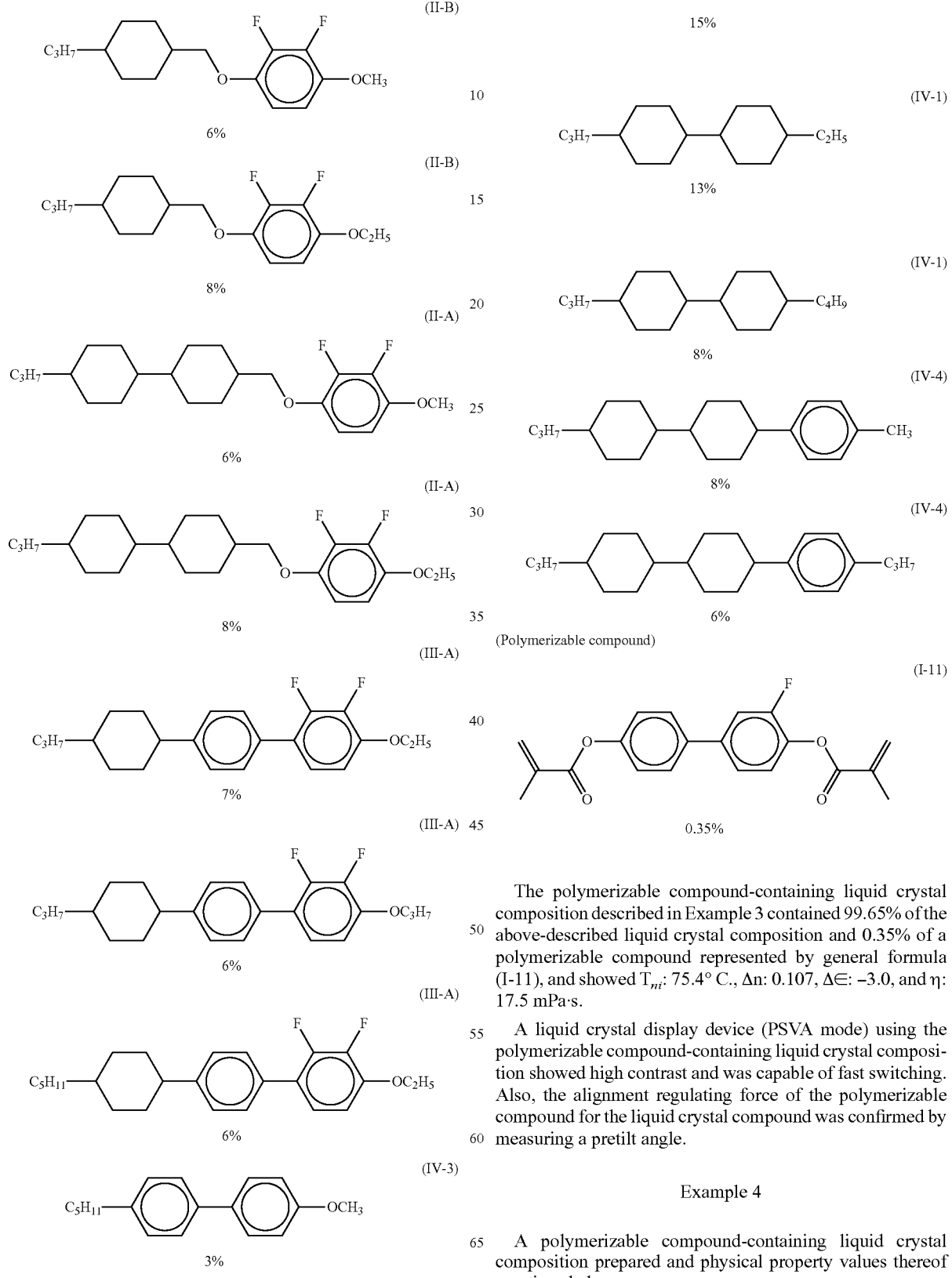

The polymerizable compound-containing liquid crystal composition described in Example 3 contained 99.65% of the above-described liquid crystal composition and 0.35% of a polymerizable compound represented by general formula (I-11), and showed $T_{ni}$: 75.4° C., Δn: 0.107, Δ∈: −3.0, and η: 17.5 mPa·s.

A liquid crystal display device (PSVA mode) using the polymerizable compound-containing liquid crystal composition showed high contrast and was capable of fast switching. Also, the alignment regulating force of the polymerizable compound for the liquid crystal compound was confirmed by measuring a pretilt angle.

Example 4

A polymerizable compound-containing liquid crystal composition prepared and physical property values thereof are given below.

[Chem. 16]

(Liquid crystal composition)

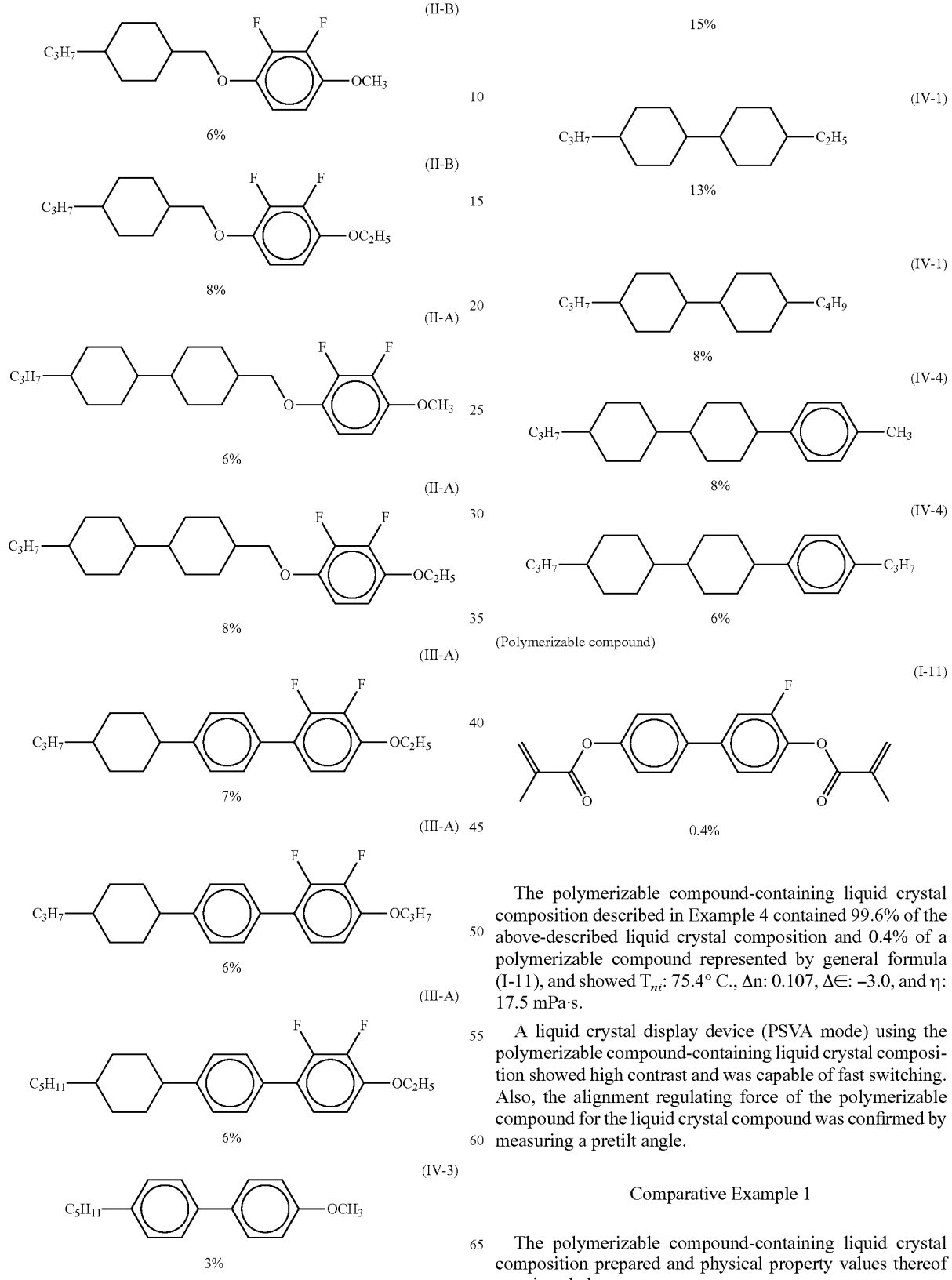

(Polymerizable compound)

The polymerizable compound-containing liquid crystal composition described in Example 4 contained 99.6% of the above-described liquid crystal composition and 0.4% of a polymerizable compound represented by general formula (I-11), and showed $T_{ni}$: 75.4° C., Δn: 0.107, Δ∈: −3.0, and η: 17.5 mPa·s.

A liquid crystal display device (PSVA mode) using the polymerizable compound-containing liquid crystal composition showed high contrast and was capable of fast switching. Also, the alignment regulating force of the polymerizable compound for the liquid crystal compound was confirmed by measuring a pretilt angle.

Comparative Example 1

The polymerizable compound-containing liquid crystal composition prepared and physical property values thereof are given below.

[Chem. 17]

(Liquid crystal composition)

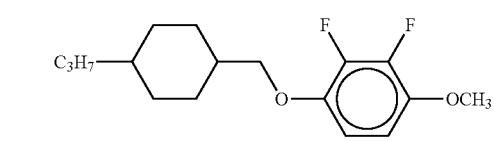
(II-B)
6%

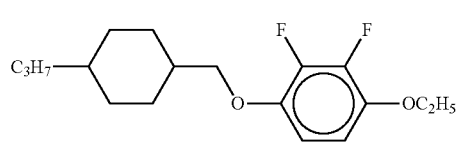
(II-B)
8%

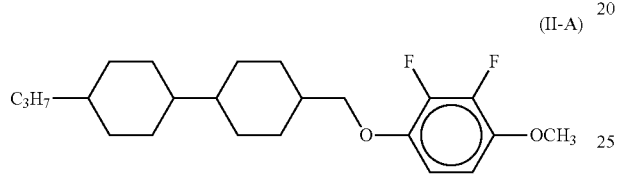
(II-A)
6%

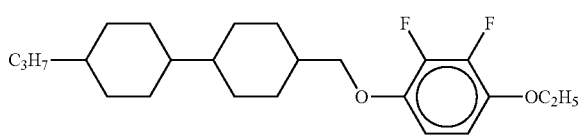
(II-A)
8%

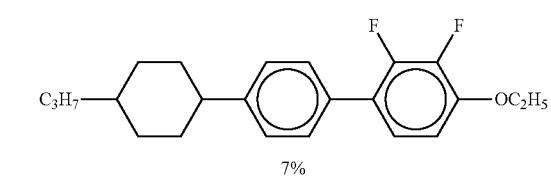
(III-A)
7%

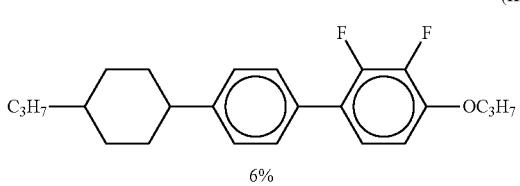
(III-A)
6%

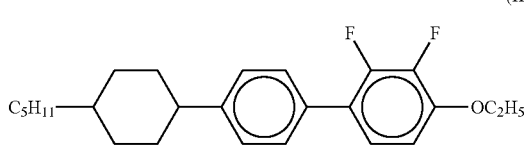
(III-A)
6%

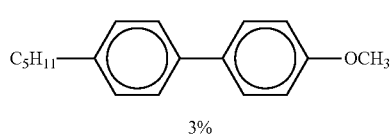
(IV-3)
3%

-continued

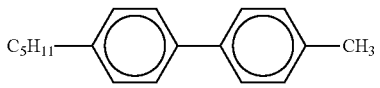
(IV-3)
15%

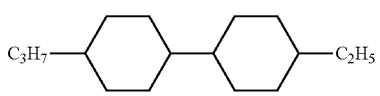
(IV-1)
13%

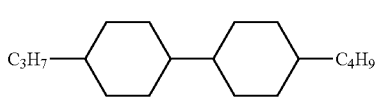
(IV-1)
8%

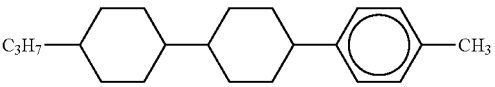
(IV-4)
8%

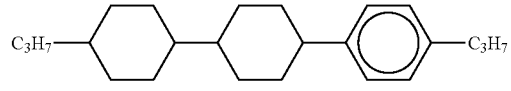
(IV-4)
6%

(Polymerizable compound)

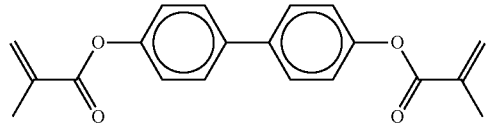
0.2%

A polymerizable compound-containing liquid crystal composition described in Comparative Example 1 contained 99.8% of the liquid crystal composition of Example 1 and 0.2% of a polymerizable compound described in Japanese Unexamined Patent Application Publication No. 2003-307720.

Each of the liquid crystal compositions of Examples 1 to 4 and Comparative Example 1 was subjected to a low-temperature storage test. As a result, Examples 1 to 4 maintained a nematic state at a temperature of any one of −40° C. and −25° C. for 2 or 3 weeks, while Comparative Example 1 maintained a nematic state only for 1 week, and precipitation was observed in the second week. This confirmed that Examples 1 to 4 maintain a nematic state within a wide temperature range and maintain stability at a low temperature over a long period of time of 2 or 3 times that of Comparative Example 1 and are very useful polymerizable compound-containing liquid crystal compositions.

TABLE 1

| | Low-temperature storage test | |
|---|---|---|
| | −40° C. | −25° C. |
| Example 1 | Nematic state for 3 weeks | Nematic state for 3 weeks |
| Example 2 | Nematic state for 3 weeks | Nematic state for 3 weeks |
| Example 3 | Nematic state for 3 weeks | Nematic state for 3 weeks |

TABLE 1-continued

| | Low-temperature storage test | |
|---|---|---|
| | −40° C. | −25° C. |
| Example 4 | Nematic state for 2 weeks | Nematic state for 3 weeks |
| Comparative Example 1 | Nematic state for 1 week | Nematic state for 1 week |

Comparative Example 2

A polymerizable compound-containing liquid crystal composition prepared and physical property values thereof are given below.

[Chem. 18]

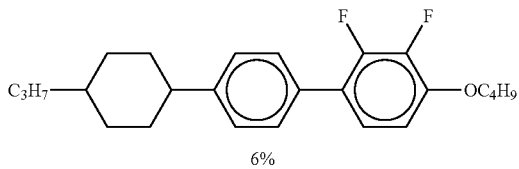

7%

(IV-11)

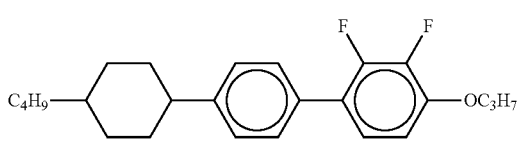

7%

(IV-11)

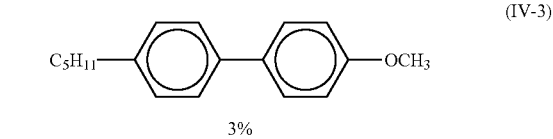

7%

(IV-11)

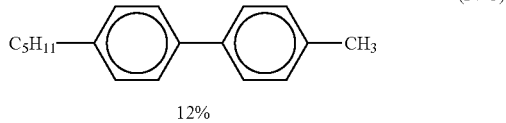

9%

(IV-12)

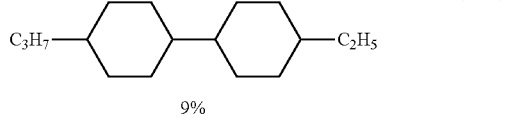

9%

(IV-12)

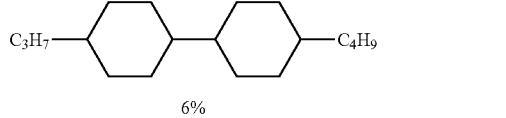

7%

(III-A)

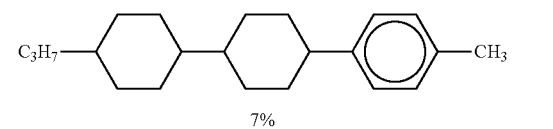

6%

(III-A)

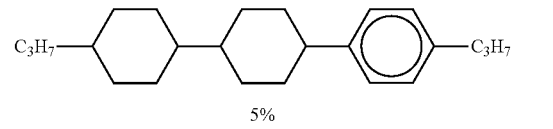

6%

(III-A)

3%

(IV-3)

$C_5H_{11}$—⬡—⬡—$OCH_3$

12%

(IV-3)

$C_5H_{11}$—⬡—⬡—$CH_3$

9%

(IV-1)

$C_3H_7$—⬡—⬡—$C_2H_5$

6%

(IV-1)

$C_3H_7$—⬡—⬡—$C_4H_9$

7%

(IV-4)

$C_3H_7$—⬡—⬡—⬡—$CH_3$

5%

(IV-4)

$C_3H_7$—⬡—⬡—⬡—$C_3H_7$ 0.2%

The polymerizable compound-containing liquid crystal composition described in Comparative Example 2 contained 99.8% of the liquid crystal composition not containing compounds represented by the general formulae (II-A) and (II-B) of the present invention and 0.2% of a polymerizable compound described in Japanese Unexamined Patent Application Publication No. 2003-307720, and showed $T_{ni}$: 76.4° C., Δn: 0.107, Δ∈: −2.9, and η: 21.2 mPa·s. It is easily supposed that since the viscosity is significantly increased, the switching speed is significantly worsened when a liquid crystal device is manufactured. A liquid crystal display device (PSVA mode) using the polymerizable compound-containing liquid crystal composition showed high contrast but showed a low switching speed and impracticality. Also, the alignment regulating force of the polymerizable compound for the liquid crystal compound was confirmed by measuring a pretilt angle.

Example 5

A polymerizable compound-containing liquid crystal composition prepared and physical property values thereof are given below.

[Chem. 19]

(Liquid crystal composition)

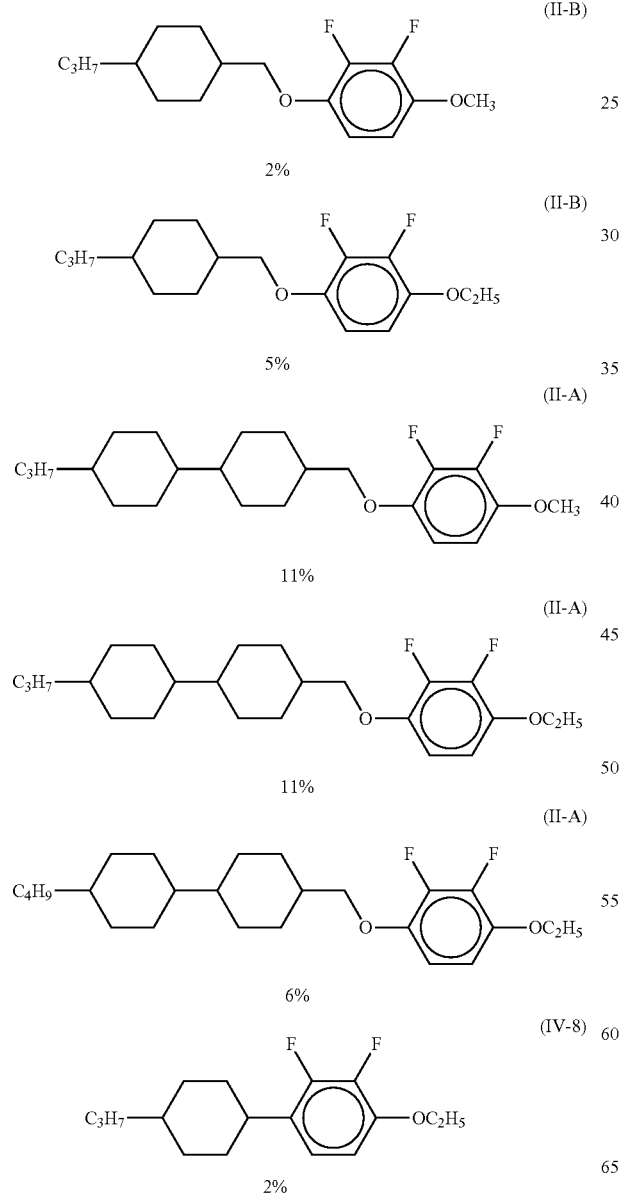

-continued

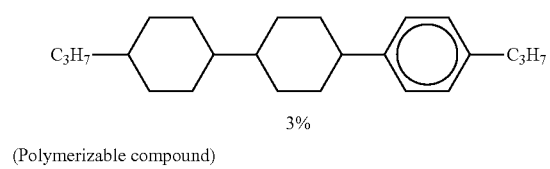

(IV-4)

3%

(Polymerizable compound)

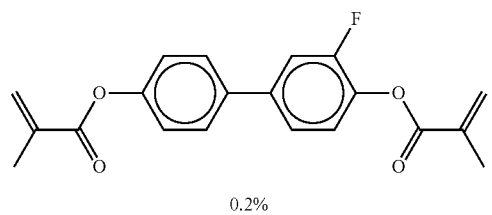

(I-11)

0.2%

The polymerizable compound-containing liquid crystal composition described in Example 5 contained 99.8% of the above-described liquid crystal composition and 0.2% of a polymerizable compound represented by general formula (I-11), and showed $T_{ni}$: 76.4° C., Δn: 0.092, Δ∈: −2.9, and η: 18.6 mPa·s.

A liquid crystal display device (PSVA mode) using the polymerizable compound-containing liquid crystal composition showed high contrast and was capable of fast switching. Also, the alignment regulating force of the polymerizable compound for the liquid crystal compound was confirmed by measuring a pretilt angle.

Example 6

A polymerizable compound-containing liquid crystal composition prepared and physical property values thereof are given below.

[Chem. 20]

(Liquid crystal composition)

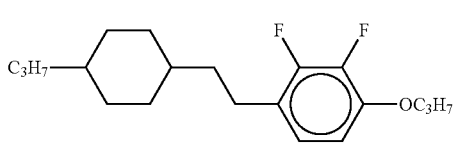

(IV-11)

2%

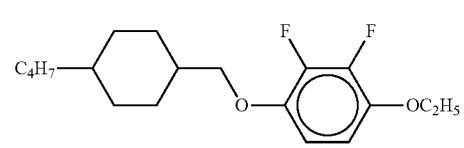

(II-B)

7%

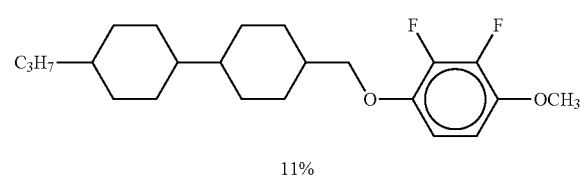

(II-A)

11%

-continued

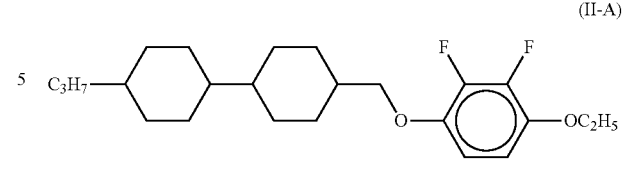

(II-A)

11%

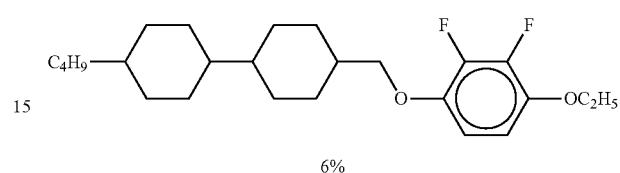

(II-A)

6%

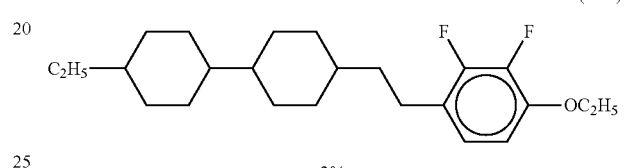

(II-A)

3%

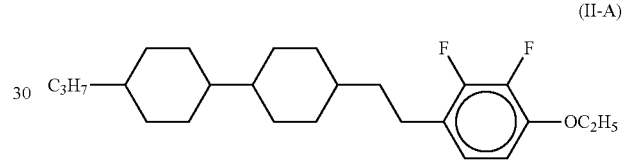

(II-A)

3%

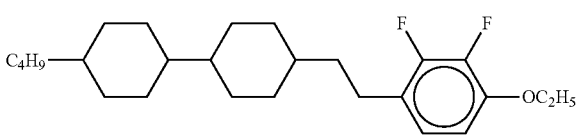

(II-A)

3%

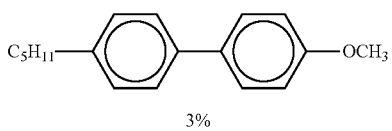

(IV-3)

3%

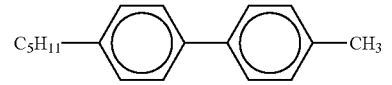

(IV-3)

15%

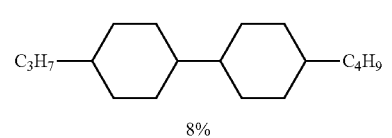

(IV-1)

14%

(IV-1)

8%

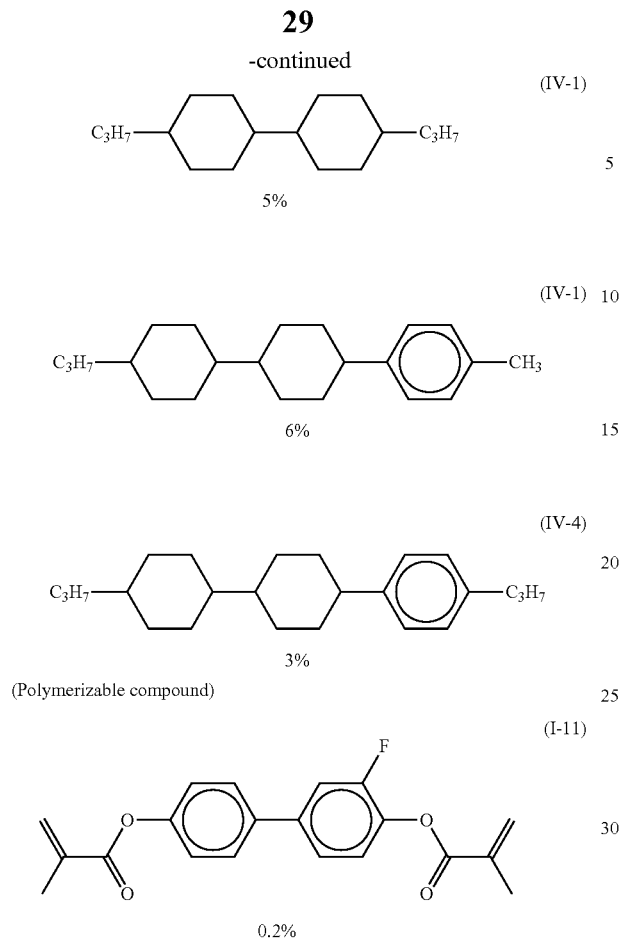

(IV-1)
5%

(IV-1)
6%

(IV-4)
3%

(Polymerizable compound)

(I-11)
0.2%

The polymerizable compound-containing liquid crystal composition described in Example 6 contained 99.8% of the above-described liquid crystal composition and 0.2% of a polymerizable compound represented by general formula (I-11), and showed $T_{ni}$: 76.3° C., Δn: 0.091, Δ∈: −2.7, and η: 18.4 mPa·s.

A liquid crystal display device (PSVA mode) using the polymerizable compound-containing liquid crystal composition showed high contrast and was capable of fast switching. Also, the alignment regulating force of the polymerizable compound for the liquid crystal compound was confirmed by measuring a pretilt angle.

Therefore, it was confirmed that the polymerizable compound-containing liquid crystal composition of the present invention maintains a nematic state over a wide temperature range, and the liquid crystal display device using the liquid crystal composition exhibits fast switching.

INDUSTRIAL APPLICABILITY

The present invention is useful as a liquid crystal composition for a liquid crystal display device.

The invention claimed is:

1. A polymerizable compound-containing liquid crystal composition comprising:
as a first component, at least one polymerizable compound represented by general formula (I-1) or general formula (I-2),

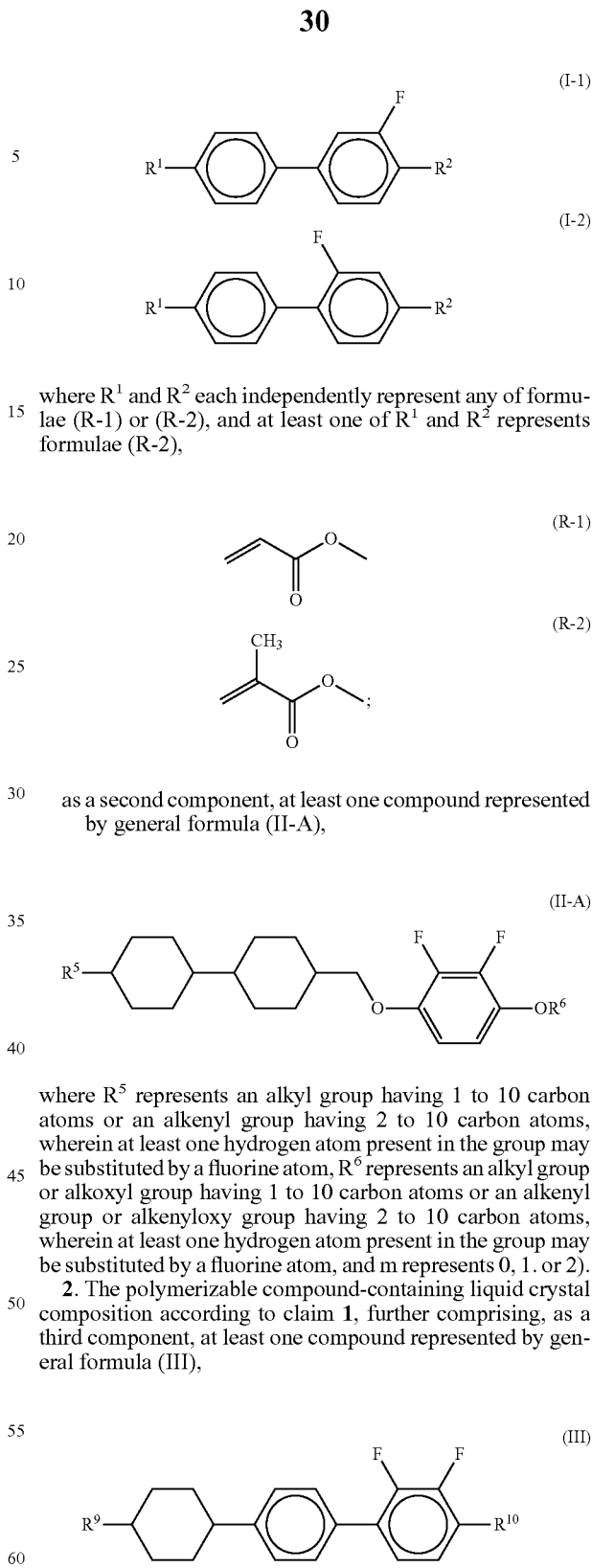

where $R^1$ and $R^2$ each independently represent any of formulae (R-1) or (R-2), and at least one of $R^1$ and $R^2$ represents formulae (R-2), (R-1)

(R-2)

as a second component, at least one compound represented by general formula (II-A), (II-A)

where $R^5$ represents an alkyl group having 1 to 10 carbon atoms or an alkenyl group having 2 to 10 carbon atoms, wherein at least one hydrogen atom present in the group may be substituted by a fluorine atom, $R^6$ represents an alkyl group or alkoxyl group having 1 to 10 carbon atoms or an alkenyl group or alkenyloxy group having 2 to 10 carbon atoms, wherein at least one hydrogen atom present in the group may be substituted by a fluorine atom, and m represents 0, 1. or 2).

2. The polymerizable compound-containing liquid crystal composition according to claim 1, further comprising, as a third component, at least one compound represented by general formula (III), (III)

where , $R^9$ represents the same meaning as $R^3$ described in claim 1, and $R^{10}$ represents the same meaning as $R^4$ described in Claim 1.

3. The polymerizable compound-containing liquid crystal composition according to claim 2, wherein the general formula (III) is general formula (III-A),

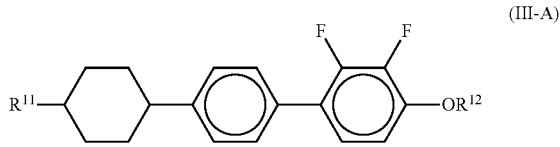

(III-A)

where $R^{11}$ and $R^{12}$ each independently represent the same meaning as $R^3$ described in Claim 1.

4. The polymerizable compound-containing liquid crystal composition according to claim 1, wherein the content of the compound represented by the general formula (I-1) and the general formula (I-2) in total (I) is 0.01% by mass to 2.0% by mass.

5. The polymerizable compound-containing liquid crystal composition according to claim 1, wherein the content of the compound represented by the general formula (II-A) is 5% by mass to 35% by mass.

6. The polymerizable compound-containing liquid crystal composition according to claim 2, wherein the content of the compound represented by the general formula (III) is 5% by mass to 35% by mass.

7. The polymerizable compound-containing liquid crystal composition according to claim 2, comprising the polymerizable compound represented by the general formula (I-1), the compound represented by general formula (II-A), a compound represented by general formula (II-B) below, and the compound represented by general formula (III-A),

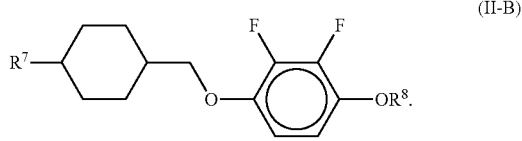

(II-B)

8. The polymerizable compound-containing liquid crystal composition according to claim 1, wherein a dielectric constant anisotropy $\Delta\epsilon$ at 25°C. is in a range of −6.0 to −2.0, a refractive index anisotropy $\Delta n$ at 25°C. is in a range of 0.08 to 0.13, a viscosity ($\eta$) at 20°C is in a range of 10 to 30 mPa·s, and a nematic-isotropic liquid phase transition temperature ($T_{ni}$) is in a range of 60°C. to 120°C.

9. A liquid crystal display device comprising the polymerizable compound-containing liquid crystal composition according to claim 1.

10. The liquid crystal display device according to claim 9, wherein the liquid crystal display device is an active matrix drive liquid crystal device.

11. The liquid crystal display device according to claim 9, wherein the liquid crystal display device is of a PSA mode, a PSVA mode, a VA mode, an IPS mode, or an ECB mode.

12. The liquid crystal display device according to claim 9, wherein a pretilt angle is 85 to 89.9 degrees.

13. The polymerizable compound-containing liquid crystal composition according claim 1, further comprising at least one compound represented by general formula (IV-3).

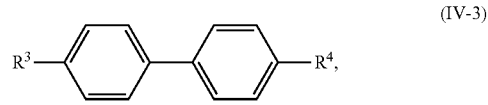

(IV-3)

where, $R^3$ represents an alkyl group having 1 to 10 carbon atoms or an alkenyl group having 2 to 10 carbon atoms, wherein at least one hydrogen atom present in the group may be substituted by a fluorine atom, $R^4$ represents an alkyl group or alkoxyl group having 1 to 10 carbon atoms or an alkenyl group or alkenyloxy group having 2 to 10 carbon atoms, wherein at least one hydrogen atom present in the group may be substituted by a fluorine atom.

14. The polymerizable compound-containing liquid crystal composition according to claim 1, further comprising at least one compound represented by general formula (IV-4),

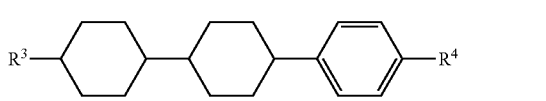

(IV-4)

where $R^3$ represents an alkyl group having 1 to 10 carbon atoms or an alkenyl group having 2 to 10 carbon atoms, wherein at least one hydrogen atom present in the group may be substituted by a fluorine atom, $R^4$ represents an alkyl group or alkoxyl group having 1 to 10 carbon atoms or an alkenyl group or alkenyloxy group having 2 to 10 carbon atoms, wherein at least one hydrogen atom present in the group may be substituted by a fluorine atom.

15. The polymerizable compound-containing liquid crystal composition according to claim 1, further comprising at least one compound represented by general formula (IV-1).

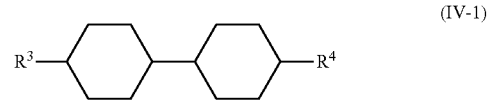

(IV-1)

where $R^3$ represents an alkyl group having 1 to 10 carbon atoms or an alkenyl group having 2 to 10 carbon atoms, wherein at least one hydrogen atom present in the group may be substituted by a fluorine atom, $R^4$ represents an alkyl group or alkoxyl group having 1 to 10 carbon atoms or an alkenyl group or alkenyloxy group having 2 to 10 carbon atoms, wherein at least one hydrogen atom present in the group may be substituted by a fluorine atom.

16. The polymerizable compound-containing liquid crystal composition according to claim 1, wherein the first component comprises the polymerizable compound represented by general formula (I-1).

* * * * *